May 12, 1942. P. C. RICHARDSON 2,282,593
APPARATUS FOR MANUFACTURING CONTOURED SHEETS AND THE LIKE
Filed June 13, 1938
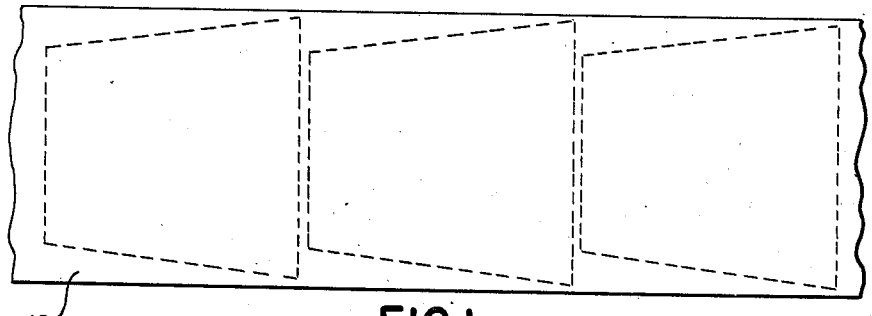
FIG.1.
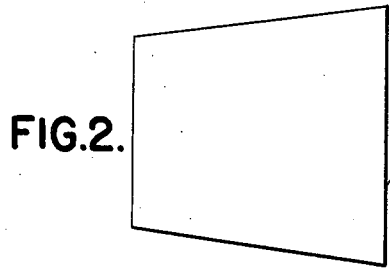
FIG.2.
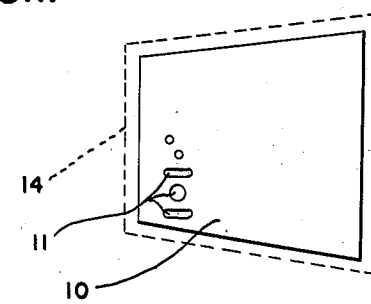
FIG.3.
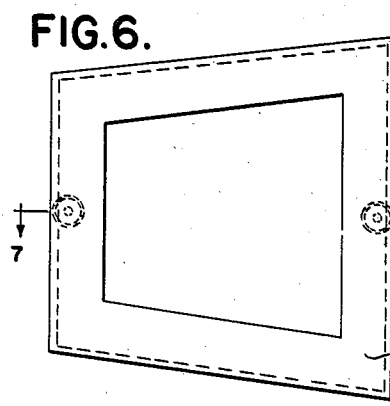
FIG.6. FIG.4.
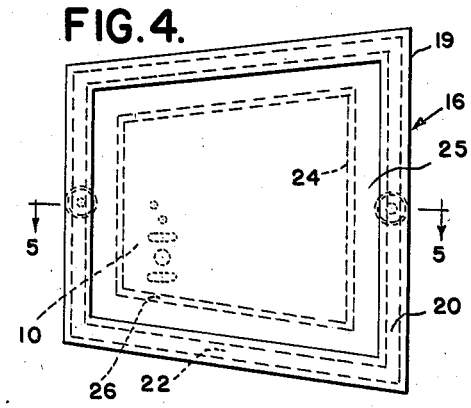
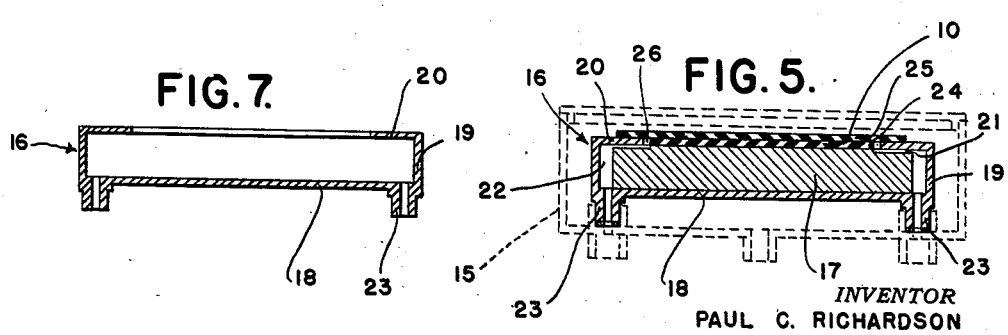
FIG.7. FIG.5.
INVENTOR
PAUL C. RICHARDSON
BY
ATTORNEYS Patented May 12, 1942

2,282,593

UNITED STATES PATENT OFFICE 2,282,593

APPARATUS FOR MANUFACTURING CONTOURED SHEETS AND THE LIKE

Paul C. Richardson, Pontiac, Mich., assignor to Baldwin Rubber Company, Pontiac, Mich., a corporation of Michigan Application June 13, 1938, Serial No. 213,539

3 Claims. (Cl. 18—19)

This invention relates to an improved method and apparatus for manufacturing contoured sheets from vulcanizable stock.

Although it will be apparent as this description proceeds that the present invention may be advantageously used in the manufacture of various different types of vulcanized sheets, nevertheless, the method and apparatus forming the subject matter of this invention finds particular utility when used in the manufacture of floor mats for motor vehicle bodies.

It has been customary in the past to form a sheet of uncured stock with an area greater than the area of the completed mat and with an outline corresponding generally to the specified outline of the mat before actually introducing the sheet to the curing operation. Upon completion of the curing operation, the margin of the sheet is trimmed to the proper size and the slots or openings for the vehicle controls are cut out from the sheet.

While mats have been satisfactorily produced by the above process, nevertheless, the latter has proved objectionable in production from the standpoint of waste. In this connection, it will be noted that the material trimmed from the sheet is in a cured state and the characteristics of this material are changed during the curing process to such an extent that it cannot successfully be combined with the uncured stock for reuse. When manufacturing mats on a large production basis, the waste is considerable and it is, therefore, one of the principal objects of this invention to provide a method and apparatus for manufacturing mats which renders it possible to selvage the trimmings and to combine the latter with the new stock preparatory to the calendering operation. In accordance with this invention, the sheet is trimmed to the desired dimension and the slots for the vehicle controls are cut out from the sheet prior to the curing operation with the result that the material removed is in an uncured state and may be successfully selvaged.

In addition to the foregoing, the present invention contemplates an improved apparatus for carrying out the several relatively simple steps of the above method, and this apparatus, as well as the method, will be made more apparent upon reference to the following description in view of the accompanying drawing, wherein:

Figure 1 is a fragmentary plan view of a strip of calendered stock;

Figure 2 is a plan view of a sheet blanked out from the calendered stock to the approximate outline of the mat;

Figure 3 is a plan view of the uncured mat after the latter has been trimmed and slotted to receive the vehicle controls;

Figure 4 is a plan view of the apparatus employed in carrying out the method;

Figure 5 is a sectional view taken on the line 5—5 of Figure 4;

Figure 6 is a plan view of the mold plate support; and

Figure 7 is a sectional view taken substantially on the plane indicated by the line 7—7 of Figure 6.

In the interests of simplicity, I have shown my improved method and apparatus as employed in the manufacture of substantially flat mats, although it will be understood as this description proceeds that any desired cross sectional contour may be imparted to the mat during the curing operation by merely selecting a form having the desired contoured surface. In Figure 3, I have shown a substantially flat mat 10 having the outline required to fit on the flooring in the driver's compartment of a motor vehicle body and possessing the openings or slots 11 required to provide for extending the several vehicle controls therethrough.

In the manufacture of mats of the above type, a mass of rubber or rubber composition, capable of being vulcanized, is subjected to a calendering operation and is rolled into a substantially flat strip, designated in Figure 1 by the reference character 12. It will, of course, be understood that during the calendering operation, care is taken to roll the strip 12 to the proper thickness and to a width slightly greater than the maximum width of the completed mat 10. Upon completion of the calendering operation, the strip 12 is introduced to a suitable blanking die and the latter serves to cut sheets 13 from the strip having an area greater than the area of the completed mat and having an outline corresponding generally to the outline of the completed mat.

In this connection, attention is called to the fact that during the calendering operation, internal stresses are set up in the strip 12 and, after the working of the material is completed, these stresses react on the material tending to shrink the latter. Therefore, the area of the sheet 13 blanked out from the strip 12 exceeds the area of the completed mat by an amount at least sufficient to compensate for the shrinkage of the material. Due to the difficulty in accurately determining the extent of the shrinkage of the sheet 13, the latter is preferably cut to an area greater than required for the amount of shrinkage in the average stock.

The excess material remaining on the sheet 13 subsequent to the rough blanking operation is indicated in Figure 3 by the dotted lines 14 and is trimmed from the sheet to provide a mat 10 of the specified area and outline. At this time, the slots or openings 11 for accommodating the vehicle controls are cut out from the sheet and the latter is subjected to the curing process. In this connection, it may be pointed out that the sheet 13 is permitted to age before finally trimming the latter and the extent of this ageing process is predetermined so that the material of the sheet 13 will have completely shrunk to its natural state before accurately or finally trimmed.

The curing process will be best understood upon reference to the apparatus shown in Figures 4 and 5, wherein the reference character 15 represents a steam chamber and the reference character 16 designates the form. In the present instance, the form 16 includes a non-metallic mold plate 17 supported on a sheet metal plate 18 having a channel-shaped marginal edge 19 adapted to receive the marginal edge portions of the mold plate 17. In other words, the top flange 20 of the channel-shaped marginal edge portion 19 overlaps the top surface of the mold plate 17 and, if desired, is spaced a limited distance above the mold plate to provide a restricted passage 21. The passage 21 is shown in Figure 4 as communicating with a chamber 22 extending around the marginal edge of the mold plate 17 and communicating at spaced points with a vacuum supply line 23.

The sheet, resulting from the final trimming operation noted in Figure 3, is placed upon the top surface of the non-metallic mold plate 17 in a manner such that the marginal edges 24 of the sheet are spaced laterally inwardly from the adjacent marginal edges of the flange 20 on the supporting member 18. An apron 25 of flexible material, such as rubber, is then positioned on the top surface of the mat 10 and the area of this apron is greater than the area of the mat by an amount determined to provide for extending the marginal edge portions of the apron over the top surface of the flange 21. As a result of the above, a chamber 26 is formed around the marginal edges of the mat 10 and this chamber communicates with the chamber 22 through the restricted passage 21. In accordance with the present invention, the vacuum lines 23 are connected to the exhaust side of a suitable vacuum pump (not shown) with the result that the apron 25 is drawn downwardly over the upper surface of the mat and over the flange 20 to provide an effective seal against the escape of air or steam beneath the apron.

The form 16 with the mat 10 in the position described above is then placed into a steam chamber 15 and steam under pressure is admitted to the chamber to cure the mat 10 to the contour of the mold plate 17. It will, of course, be understood that the differential pressure existing on opposite sides of the apron 25 insures maintaining an effective seal during the curing process with the result that the mat will be accurately formed against the mold plate 17. The contour of the mold plate will, of course, depend upon the desired contour of the mat and the invention should not be limited to manufacturing mats of any specific shape.

Upon completion of the curing operation, the mold 16 is, of course, removed from the steam chamber 15 and the source of vacuum is discontinued in order to permit the apron, as well as the mat to be removed from the mold plate 17. The mat is in its final form and does not require any subsequent trimming operations. As stated above, all of the trimming operations are effected before the mat is subjected to the curing process and this is desirable since the material trimmed from the mat may be selvaged and combined with the rubber stock preparatory to the next calendering operation.

What I claim as my invention is:

1. In apparatus for manufacturing a mat from vulcanizable stock, a form having a surface corresponding in shape to the predetermined desired contour of the completed mat and over which a sheet of uncured stock is adapted to be placed, means surrounding the surface aforesaid on the form and extending in a plane including the plane occupied by the uncured stock on the form, a sheet of flexible material covering the sheet of uncured stock and having the marginal edges overlapping said means providing a continuous seal around the marginal edges of the stock, and means subjecting the opposite sides of the covering sheet to the action of differential pressures with a preponderance of pressure acting on the exposed face of the covering sheet whereby the latter is drawn against the adjacent surface of the stock to in turn clamp the stock against the surface aforesaid of the form.

2. In apparatus for manufacturing a mat from a sheet of vulcanizable stock, a form having a surface on which a sheet of uncured stock is adapted to be placed, a member having a continuous marginal flange extending over the marginal edges of the form and forming a recess above the form having an area sufficient to receive a sheet of uncured stock to be vulcanized, a flexible covering sheet adapted to extend over the recess with the marginal edges thereof overlapping the flange, and means subjecting the opposite sides of the covering sheet to differential pressures with a preponderance of pressure acting on the outer surface of the covering sheet in a manner to clamp the marginal edge portions of the covering sheet against said marginal flange and to urge the sheet of vulcanizable stock in the recess against the adjacent surface of the form.

3. In apparatus for manufacturing a mat from a sheet of vulcanizable stock, a form having a surface on which a sheet of uncured stock is adapted to be placed, a member having a continuous marginal flange extending over the marginal edge portions of the form in vertical spaced relation to the marginal edge portions of the form and defining an area sufficient to permit a sheet of vulcanizable stock to be placed on the form within the confines of said continuous marginal flange, a flexible covering sheet adapted to extend over the surface aforesaid of the form with the marginal edges thereof overlapping the continuous marginal flange, and means for withdrawing air from the space between said marginal flange and form in a manner to urge the flexible covering sheet toward the form and thereby clamp the sheet of vulcanizable stock against the form.

PAUL C. RICHARDSON.